United States Patent [19]

Jung et al.

[11] Patent Number: 5,322,897

[45] Date of Patent: Jun. 21, 1994

[54] COPOLYMERS CONTAINING HYDROXYL GROUPS, BASED ON VINYL ESTER MONOMERS, VINYLAROMATIC MONOMERS AND HYDROXYLALKYL ESTER MONOMERS, PROCESS FOR THE PREPARATION THEREOF AND USE THEREOF IN COATING COMPOSITIONS

[75] Inventors: Werner A. Jung; Udo Vorbeck, both of Ascheberg, Fed. Rep. of Germany

[73] Assignees: BASF Lacke; Farben Aktiengesellschaft, Munster, Fed. Rep. of Germany

[21] Appl. No.: 634,175

[22] PCT Filed: Jun. 19, 1989

[86] PCT No.: PCT/EP89/00688

§ 371 Date: Dec. 19, 1990

§ 102(e) Date: Dec. 19, 1990

[87] PCT Pub. No.: WO90/00570

PCT Pub. Date: Jan. 25, 1990

[30] Foreign Application Priority Data

Jul. 7, 1988 [DE] Fed. Rep. of Germany ....... 3823005

[51] Int. Cl.$^5$ ............................................... C08F 8/32
[52] U.S. Cl. ................................. 525/123; 525/328.8; 525/379; 526/79; 526/318.42; 526/318.45
[58] Field of Search ................. 526/79; 525/123, 328.8

[56] References Cited

U.S. PATENT DOCUMENTS 3,669,942 6/1972 Van Westrenen et al. ......... 525/162
3,956,245 5/1976 Van Steenis et al. ............... 525/285
4,062,908 12/1977 van Acker et al. .................. 525/285

*Primary Examiner*—Bernard Lipman
*Attorney, Agent, or Firm*—Anne Gerry Sabourin

[57] ABSTRACT

The invention relates to copolymers containing hydroxyl groups having a hydroxyl value of 50 to 200 mg of KOH/g and an average molecular weight (number average) of 1500 to 6000, which can be prepared by free-radical solution polymerization at temperatures of 130° to 200° C. of 5 to 25% by weight of vinyl ester monomers, 10 to 50% by weight of vinylaromatic monomers, 10 to 50% by weight of hydroxyalkyl ester monomers and, if desired, other monomers, in which the vinyl ester is initially used and the remaining monomers are added over a monomer addition period which is the same for all monomers as follows:

i) The amount of the acrylate monomer added per unit time remains constant.

ii) The amount of the vinylaromatic hydrocarbon added over the first third of the monomer addition period is 15 to 30% by weight, preferably 18 to 26% by weight, that added over the second third is 25 to 40% by weight, preferably 30 to 38% by weight, and that added over the last third is 35 to 60% by weight preferably 40 to 50% by weight, of the total amount of the vinylaromatic hydrocarbon.

The subject-matter of the invention is also a process for the preparation of the copolymers as well as their use in coating compositions.

17 Claims, No Drawings

COPOLYMERS CONTAINING HYDROXYL GROUPS, BASED ON VINYL ESTER MONOMERS, VINYLAROMATIC MONOMERS AND HYDROXYALKYL ESTER MONOMERS, PROCESS FOR THE PREPARATION THEREOF AND USE THEREOF IN COATING COMPOSITIONS

The invention relates to copolymers soluble in organic solvents and containing hydroxyl groups, which can be prepared by free-radical solution polymerization of vinyl ester monomers, vinylaromatic monomers, hydroxyalkyl ester monomers and, if desired, other copolymerizable monomers, to a process for the preparation thereof and to the use thereof in coating compositions.

Acrylate polymers containing hydroxyl groups are well known, as are coating compositions which contain these polymers as the major binder component (cf. for example EP-A-103,199, EP-A-52,223, EP-B-39,797, EP-A-136,667 and EP-B-64,338).

It is further known that problems occur in the preparation of acrylate copolymers if monomers are used which, compared with acrylate monomers, possess widely differing reactivities, for example vinyl esters of aliphatic monocarboxylic acids of 5 to 15 carbon atoms branched in the α-position. In these cases it is difficult to obtain uniform, i.e. randomly and homogeneously distributed copolymers.

One possibility of solving this problem lies in the process, described in U.S. Pat. No. 4,039,734, for copolymerization of monomers of different reactivities, in which process at least a part of the reactive monomers is continuously added to the reaction mixture in such an amount that the relative ratio of the monomers remains constant. The amount of monomers required in each case for this purpose is determined from the liberated heat of reaction.

The process described in DE-PS 2,032,647 furnishes homogeneous vinyl ester, vinylaromatic and hydroxyacrylate copolymers corresponding to stepwise addition of the individual monomers. This process initially uses the total amount of vinyl esters together with 5 to 15% by weight of the total amount of the vinylaromatic hydrocarbons and the total amount of the other hydroxyl monomers and unsaturated carboxylic acids. The remaining amount of the monomers is then either added gradually in toto or at such a rate that the addition of the OH— and COOH-containing monomers takes longer than that of the vinylaromatic hydrocarbons. A disadvantage of this process are the very high residual monomeric content (i.e. the amount of unreacted starting monomer, expressed in % by weight, based on the total amount of this monomer used originally) of up to 40% by weight of vinyl esters when a high proportion of vinylaromatic hydrocarbons of up to 50% by weight is used, as well as the associated toxicity problems. Because of the contamination of the environment by solvents when paint films are drying, a further disadvantage is the high solvent content of the coating composition due to the high viscosity of the binder solutions. There is the additional risk of cloudiness occurring in polymeric solutions with a high solids content which can only be eliminated by the addition of further solvents.

The English language technical report by Shell "VeoVa polymers LR-40 and LR-2041 for water-thinnable paints" describes copolymers containing vinyl esters, vinylaromatic hydrocarbons and hydroxyalkyl esters which, however, also suffer from precisely the shortcomings described above.

Finally, a few mass polymerization processes for the preparation of copolymers containing vinyl esters in which the total amount of the vinyl ester is heated, if desired with a part of the total amount of the other monomers and, if desired, an initiator, and the remaining amount of monomers and initiator or is then added gradually (cf. for example DE-PS 2,422,043 and DE-OS 2,615,101), are also known. It is true that these processes succeed in completely incorporating the vinyl ester (residual monomer content < 10% by weight), but the copolymer solutions obtained in this manner are cloudy after the polymer mass has dissolved, and are unsuitable for paint formulations.

The object of the invention has thus been to make available copolymers containing hydroxyl groups, based on vinyl ester monomers, vinylaromatic monomers and hydroxyalkyl ester monomers as well as, if desired, other copolymerizable monomers, which can be prepared by a simple method, which have a low residual monomer content (< 10% by weight) even if a high proportion of vinyl-aromatic hydrocarbons of up to 50% by weight, based on the total amount of monomers, is used, and which furnish clear solutions. The coating compositions prepared from these copolymers should have a viscosity of 16 to 20 s, measured in a DIN 4 efflux cup, which is suitable for processing, a solids content as high as possible and good pigmentability, and which should lead to coatings with good technical properties, especially good hardness.

Surprisingly, this object is achieved by a copolymer (A) containing hydroxyl groups which can be prepared by free-radical solution polymerization, wherein, the copolymer (A) has a hydroxyl value of 50 to 200 mg of KOH/g, preferably 70 to 150 mg of KOH/g, and an average molecular weight (number average) of 1500 to 6000, and which can be prepared by free-radical solution polymerization, at temperatures of 140° to 200° C., of

- $a_1$) 5 to 25% by weight, preferably 10 to 19% by weight, of one or more vinyl esters of monocarboxylic acids, preferably vinyl esters of monocarboxylic acids of 5 to 15 carbon atoms per molecule, branched in the α-position,
- $a_2$) 10 to 50% by weight, preferably 20 to 45% by weight, of one or more vinylaromatic hydrocarbons,
- $a_3$) 10 to 40% by weight, preferably 15 to 35% by weight, of one or more hydroxyalkyl esters of α,β-unsaturated carboxylic acids,
- $a_4$) 0 to 40% by weight of other ethylenically unsaturated copolymerizable monomers, the sum of the components $a_1$ to $a_4$ always being 100% by weight, in which 1.) at least 60% by weight, preferably 100% by weight, of the total amount of the component $a_1$ is initially used,
2.) the components $a_2$ to $a_4$ and the remainder of the component $a_1$, if any, are added over a monomer addition period which is the same for all components in such a manner that
   - i) the amount of the component $a_1$ added per unit time remains constant or decreases over the monomer addition period, ii) the amount of the components $a_3$ and $a_4$ added per unit time remains constant over the monomer ddition period, and iii) the amount of the component $a_2$ added over the first third of the monomer addition period is 15 to 30% by weight, preferably 18 to 26% by weight, of the total amount of the component $a_2$, that added over the second third is 25 to 40% by weight, preferably 30 to 38% by weight, and that added over the last third is 35 to 60% by weight, preferably 40 to 50% by weight, of the total amount of the component $a_2$.

Vinyl esters of monocarboxylic acids, preferably vinyl esters of monocarboxylic acids of 5 to 15 carbon atoms per molecule branched in the α-position, are used as the component $a_1$. The branched monocarboxylic acids may be obtained by reacting formic acid or carbon monoxide and water with olefins in the presence of a liquid, strongly acid catalyst; the olefins may be cracking products of paraffinic hydrocarbons, such as mineral oil fractions, and may contain both branched and straight-chain acyclic and/or cycloaliphatic olefins. When these olefins are reacted with formic acid or carbon monoxide and water, a mixture of carboxylic acids in which the carboxyl groups are predominantly located on a quaternary carbon atom, is formed. Other olefinic starting materials are, for example, propylene trimer, propylene tetramer and diisobutylene. The vinyl esters may be also prepared from the acids in a manner known per se, for example by reacting the acids with acetylene.

Because of their ready availability, vinyl esters of saturated aliphatic monocarboxylic acids of 9 to 11 carbon atoms, branched at the α-carbon atoms, are particularly preferred. Furthermore, the vinyl ester of p-tert-butylbenzoic acid is particularly preferred. Examples of other suitable vinyl esters are vinyl acetate and vinyl propionate.

The amount of the component $a_1$ is 5 to 25% by weight, preferably 10 to 19% by weight.

The component $a_2$ is a monovinylaromatic compound which preferably contains 8 to 9 carbon atoms per molecule. Examples of suitable compounds are styrene, vinyltoluenes, α-methylstyrene, chlorostyrenes, o-, m-or p-methylstyrene, 2,5-dimethylstyrene, p-methoxystyrene, p-tert-butylstyrene, p-dimethylaminostyrene, p-acetamidostyrene and m-vinylphenol. Vinyltoluenes and particularly styrene are preferably used. The amount of the component $a_2$ is 10 to 50% by weight, preferably 20 to 45% by weight.

Compounds which are suitable as the component $a_3$ are hydroxyalkyl esters of α,β-unsaturated carboxylic acids with primary or secondary hydroxyl groups. If it is desired that the acrylate copolymer is highly reactive, hydroxyalkyl esters with primary hydroxyl groups may be used exclusively; if it is desired that the polyacrylate is less reactive, hydroxyalkyl esters with secondary hydroxyl groups may be used exclusively. Mixtures of hydroxyalkyl esters with primary hydroxyl groups and of hydroxyalkyl esters with secondary hydroxyl groups may of course also be used. Examples of suitable hydroxyalkyl esters of α,β-unsaturated carboxylic acids with primary hydroxyl groups are hydroxyethyl acrylate, hydroxypropyl acrylate, hydroxylbutyl acrylate, hydroxyamyl acrylate, hydroxylhexyl acrylate, hydroxyoctyl acrylate and the corresponding methacrylates. Examples of suitable hydroxyalkyl esters with a secondary hydroxyl group are 2-hydroxypropyl acrylate, 2-hydroxybutyl acrylate, 3-hydroxybutyl acrylate and the corresponding methacrylates.

The corresponding esters of other α,β-unsaturated carboxylic acids, for example crotonic or isocrotonic acids, may of course be used in each case.

The component $a_3$ may advantageously be at least in part a reaction product obtained from 1 mol of hydroxyethyl acrylate and/or hydroxyethyl methacrylate and on average two mol of ε-caprolactone.

A reaction product obtained from acrylic acid and/or methacrylic acid and the glycidyl ester of a carboxylic acid with one tertiary α-carbon atom may also be used at least in part as the component $a_3$. Glycidyl esters of strongly branched monocarboxylic acids are obtainable under the brand name "Cardura". The reaction of acrylic acid or methacrylic acid with the glycidyl ester of a carboxylic acid with a tertiary α-carbon atom may take place either prior to, during or after the polymerization reaction. Care must be taken that the acid value of the finished polyacrylate is in the range of 5 to 30 mg of KOH/g, preferably 8 to 25 mg of KOH/g.

The component $a_3$ is used in an amount from 10 to 40% by weight, preferably 15 to 35% by weight.

In addition, 0 to 40% by weight of other ethylenically unsaturated, copolymerizable monomers (component $a_4$) may be used for the synthesis of the copolymer (A) containing hydroxyl groups. The choice of these monomers is not particularly critical. However, care must be taken that the incorporation of these monomers does not give rise to undesirable properties of the copolymer. The choice of the component $a_4$ is thus largely governed by the desired properties of the curable composition in respect of elasticity, hardness, compatibility and polarity.

Alkyl esters of olefinically unsaturated carboxylic acids are preferably used as the component $a_4$. Examples of these are methyl (meth)acrylate, ethyl (meth)acrylate, propyl (meth)acrylate, butyl (meth)acrylate, isopropyl (meth)acrylate, isobutyl (meth)acrylate, pentyl (meth)acrylate, isoamyl (meth)acrylate, hexyl (meth)acrylate, cyclohexyl (meth)acrylate, 2-ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate, octadecenyl (meth)acrylate as well as the corresponding esters of maleic, fumaric, crotonic, isocrotonic, vinylacetic and itaconic acids.

In addition, other ethylenically unsaturated compounds are suitable as the component $a_4$, for example alkoxyethyl acrylates, aryloxyethyl acrylates and the corresponding methacrylates, for example butoxyethyl (meth)acrylate, phenoxyethyl (meth)acrylate; unsaturated carboxylic acids, for example acrylic acid, methacrylic acid, itaconic acid, crotonic acid and half-esters of maleic and fumaric acids as well as their mixtures; unsaturated compounds with tertiary amino groups, for example N,N'-diethylaminoethyl methacrylate, 2-vinylpyridine, 4-vinylpyridine, vinylpyrroline, vinylquinoline, vinylisoquinoline, N,N'-dimethylaminoethyl vinyl ether and 2-methyl-5-vinylpyridine; compounds such as acrylonitrile, methacrylonitrile, acrolein and methacrolein.

The polymerization of the monomeric components $a_1$ to $a_4$ is preferably carried out in the absence of oxygen, for example by working in a nitrogen atmosphere. The reaction vessel is equipped with suitable stirring, heating and cooling equipment as well as with a reflux condenser which condenses volatile constituents, for example styrene. The polymerization reaction is carried out at temperatures of 130°–200° C., preferably of 150°–180° C., in the presence of polymerization initiators and, if appropriate, polymerization regulators.

Suitable free-radical initiators are organic peroxides, for example dibenzyl peroxide, dicumyl peroxide cumene hydroperoxide, di-tert-butyl peroxide, tert butyl hydro-peroxide, 2,2-di-tert-butylperoxybutane, tert-amyl perbenzoate, 1,3-bis(tert-butylperoxyisopropyl)-benzene, diisopropylbenzene monohydroperoxide and diacyl peroxides, for example diacetyl peroxide, peroxyketals, for example 2,2-di(tert-amylperoxy)propane and ethyl 3,3-di(tert-amylperoxy)butyrate, thermolabile highly substituted ethane derivatives, for example those based on silyl-substituted ethane derivatives and those based on benzpinacol. Aliphatic azo compounds, for example azobiscyclohexanenitrile, may be furthermore used. Depending on the monomers used, however, there is the risk of yellowing of the polymers when azo compounds are employed, which may cause interference depending on the application of the polymers, so that other initiators must then be used in these cases.

The amount of initiator to be used is in the majority of cases 0.1 to 5% by weight, based on the amount of monomers to be processed, but it can be even higher if required. The initiator, dissolved in some of the solvent used for the polymerization, is gradually added during the polymerization reaction. The addition of the initiator preferably takes about 1 to 2 hours longer than the addition of the monomers in order to achieve a good effect during the postpolymerization phase. If the initiators used decompose only slowly under the prevalent reaction conditions, it is also possible to introduce the initiator at the outset.

The reaction is preferably carried out in the presence of polymerization regulators, since clouding of the polymer solutions is thereby better avoided. Mercapto compounds are preferably used as regulators, mercaptoethanol being particularly preferred. Examples of other possible regulators are alkyl mercaptans, for example tert-dodecyl mercaptan, octyl mercaptan, phenyl mercaptan, octyl-decyl mercaptan, butyl mercaptan, thiocarboxylic acids, for example thioacetic acid or thiolactic acid.

These regulators are used in an amount of up to 2% by weight, based on the amount of monomers to be processed. They are preferably dissolved in one of the monomers feeds and added with the monomers. The amount of regulator added is preferably constant per unit time.

The polymerization is carried out in a high-boiling organic solvent which is inert toward the monomers used. Examples of suitable solvents are high-boiling alcohols, for example n-hexanol, 2-ethylhexanol, isooctyl alcohol, isononyl alcohol, isodecyl alcohol, isotridecyl alcohol, cyclohexanol, methylcyclohexanol, benzyl alcohol, methylbenzyl alcohol, tetrahydrofurfuryl alcohol, diacetone alcohol, 2,6-dimethyl-4-heptanol, 4-methyl-2-pentanol, tridecanol; glycols and glycol derivatives, for example ethylene glycol, 1,2-propylene glycol, 1,3-butylene glycol, butane-1,4-diol, hexylene glycol, 2-ethylhexane-1,3-diol, diethylene glycol, triethylene glycol, dipropylene glycol, methyldiglycol, ethyldiglycol, butyldiglycol, hexyldiglycol, tripropylene glycol methyl ether, methoxytriglycol, ethylglycol acetate, butylglycol acetate, ethyldiglycol acetate, ethylene glycol diacetate; higher substituted aromatic hydrocarbons, for example Solvent Naphtha ®, heavy naphtha, various types of Solvesso ®, various types of Shellsol ® and Deasol ® as well as higher-boiling aliphatic and cycloaliphatic hydrocarbons, for example various white spirits, mineral terpentine, tetralin and decalin. With certain combinations of monomers (for example monomers containing amino groups plus monomers containing carboxyl groups) only inert solvents, such as aromatic and aliphatic hydrocarbons or esters, should be used.

If the copolymers (1) containing hydroxyl groups are furthermore modified in a 2nd step, for example by reaction with compounds (B) which contain on average 0.8 to 1.5 free NCO groups and at least one tertiary amino group per molecule, then the solvent used in the polymerization, i.e. in the preparation of the polymers (A), must of course also be inert towards the compounds (B).

It is an essential part of the invention that the copolymerization of the components $a_1$ to $a_4$ is carried out as follows:

At least 60% by weight, preferably 100% by weight, of the total amount of the component $a_1$ to be used is first placed in the reaction vessel together with some of the total amount of solvent to be used and the mixture is heated to the particular reaction temperature. The remainder of the solvent is added gradually, preferably together with the catalyst, as already described. The remaining amount of the components $a_1$, if any, and the other monomers (the components $a_2$, $a_3$ and $a_4$) are added to the initially introduced component $a_1$ over a monomer addition period which is the same for all components (generally 2–10 hours, as is customary for acrylate copolymerizations) as follows:

i) The amount of the component $a_1$ which has not yet been added to the reaction vessel, if any (i.e. the remainder of the component $a_1$ which has not been placed in the reaction vessel), remains constant or decreases over the monomer addition period, the latter procedural variant being preferred. If the amount added is constant, the component $a_1$ is preferably added together with the components $a_3$ and $a_4$.

ii) The amount of the components $a_3$ and $a_4$ added per unit time remains constant over the monomer addition period.

iii) The amount of the component $a_2$ added per unit time is varied over the monomer addition period in such a manner that the total amount of the component $a_2$ added over the first third of the monomer addition period is 15 to 30% by weight, preferably 18 to 26% by weight, of the total amount of the component $a_2$. A total of 25 to 40% by weight, preferably 30 to 38% by weight, is added over the second third of the monomer addition period, and 35 to 60% by weight, preferably 40 to 50% by weight, of the total amount of the component $a_2$ are added over the last third of the monomer addition period, the amounts added in the 1st, 2nd and 3rd thirds of course totaling 100% by weight.

There are various ways of varying the amount of the component $a_2$ added per unit time, the only decisive factor being that the total of the amounts added in each third, as stated above, is maintained. Thus, for example, the possibility exists of a stepwise variation of the amount of the component $a_2$ added per unit time. The number of steps in which the amount added may vary may be chosen as desired. Thus, for example, the amount of the component $a_2$ added per unit time may only be increased at the start of the second third and/or at the start of the third third. Within each third the amount added per unit time always remains constant. It is also possible, however, to vary continuously the amount of the component $a_2$ added per unit time, corresponding to the limit case of an infinite number of steps.

The addition of the components in the manner indicated promotes, as is assumed, the copolymerization and reduces the homopolymerization of the individual components. In addition, copolymers having a very low residual monomer content which produce clear solutions with a high solids content are obtained. The copolymers (A) containing hydroxyl groups, obtained in this manner, have an average molecular weight (number average) of 1500 to 6000 and a OH value of 50 to 200 mg of KOH/g, preferably 8 to 25 mg of KOH/g, and an amine value of 1 to 10 mg of KOH/g, preferably 1 to 5 mg of KOH/g. 50% solutions of the copolymers according to the invention in butyl acetate have typical viscosities of 0.2 to 4 dPas at 23° C.

Apart from using monomers containing tertiary amino groups in the polymerization, it is also possible to introduce tertiary amino groups into the copolymer (A) containing hydroxyl groups by a reaction with compounds (B) which contain on average 0.8 to 1.5, preferably 1, free isocyanate groups per molecule. This procedure is particularly preferred when the copolymers are intended for the preparation of clearcoat paints.

The reaction of the copolymers (A) with the compounds (B) is carried out in a solvent which is inert to isocyanates at temperatures of 10° to 100° C., preferably 50° to 80° C., if desired in the presence of organic tin compounds as catalysts, to a virtually zero NCO value. The amount of the compound (B) is chosen such that the resultant resin has an amine value of 1 to 10 mg of KOH/g, preferably 1 to 5 mg of KOH/g.

The compounds (B) used to introduce the tertiary amino group into the copolymer (A) are prepared by reacting diisocyanates or polyisocyanates with less than a stoichiometric amount of a tertiary amine. Tertiary amines of the general formula $NR_1R_2R_3$ are suitable for this reaction, $R_1$ preferably denoting an alkanol radical or another radical containing hydroxyl groups and $R_2$ and $R_3$ representing alkyl or cycloalkyl radicals, Dialkylalkanolamines, for example dimethylethanolamine, diethylethanolamine and their higher homologs and isomers, are preferred.

Examples of suitable diisocyanates or polyisocyanates are: Aromatic isocyanates, for example 2,4- and 2,6-toluylene diisocyanate and their mixtures, 4,4'-diphenylmethane diisocyanate, m-phenylene diisocyanate, p-phenylene diisocyanate, 4,4'-diphenyl diisocyanate, 1,5-naphthalene diisocyanate, 1,4-naphthalene diisocyanate, 4,4'-toluidine diisocyanate, xylylene diisocyanate as well as substituted aromatic systems, for example dianisidine diisocyanates, 4,4'-diphenyl ether diisocyanates or chlorodiphenylene diisocyanates and aromatic isocyanates with a higher functionality, for example 1,3,5-triisocyanaatobenzene, 4,4'-,4"-triisocyanatotriphenylmethane, 2,4,6-triisocyanatotoluene and 4,4'-diphenyldimethylmethane 2,2',5,5'-tetraisocyanate; cycloaliphatic isocyanates, for example 1,3-cyclopentane diisocyanate, 1,4-cyclohexane diisocyanate, 1,2-cyclohexane diisocyanate and isophorone diisocyanate; aliphatic isocyanates, for example trimethylene diisocyanate, tetramethylene diisocyanate, pentamethylene diisocyanate, hexamethylene diisocyanate, trimethylhexamethylene 1,6-diisocyanate and tris-hexamethylene triisocyanate.

Diisocyanates having isocyanate groups of different reactivities, for example isophorone diisocyanate, are preferably employed.

The subject-matter of the invention is also a process for the preparation of copolymers (A) containing hydroxyl groups by free-radical solution polymerization, wherein a$_1$) 5 to 25% by weight, preferably 10 to 19% by weight, of one or more vinyl esters of monocarboxylic acids, preferably vinyl esters of monocarboxylic acids of 5 to 15 carbon atoms per molecule branched in the α-position, a$_2$) 10 to 50% by weight, preferably 20 to 45% by weight, of one or more vinylaromatic hydrocarbons, a$_3$) 10 to 40% by weight, preferably 15 to 35% by weight, of one or more hydroxyalkyl esters of α,β-unsaturated carboxylic acids, a$_4$) 0 to 40% by weight of other ethylenically unsaturated copolymerization monomers, the sum of the components a$_1$ to a$_4$ always being 100% by weight, are reacted at temperatures of 130° to 200° C., preferably 150° to 180° C., to form a copolymer (A) having a hydroxyl value of 50 to 200 mg of KOH/g, preferably 70 to 150 mg of KOH/g, and an average molecular weight (number average) of 1500 to 6000, in which 1.) at least 60% by weight, preferably 100% by weight, of the total amount of the component a$_1$ is initially used, 2.) the components a$_2$ to a$_4$ and the remainder of the component a$_1$, if any, are added over a monomer addition period which is the same for all components in such a manner that i) the amount of the component a$_1$ added per unit time remains constant or decreases over the monomer addition period, ii) the amount of the components a$_3$ and a$_4$ added per unit time remains constant over the monomer addition period, and iii) the amount of the component a$_2$ added over the first third of the monomer addition period is 15 to 30% by weight, preferably 18 to 26% by weight, of the total amount of the component a$_2$, that added over the second third is 25 to 40% by weight, preferably 30 to 38% by weight, and that added over the last third is 35 to 60% by weight, preferably 40 to 50% by weight, of the total amount of the component a$_2$.

The components a$_1$ to a$_4$ to be used in this process as well as the procedure of the process according to the invention have already been described in detail in connection with the copolymers (A) according to the invention, so that here only a reference is made to this description.

The subject-matter of the present invention are furthermore coating compositions which contain the copolymers containing hydroxyl groups according to the invention as binder components. Curing components which are suitable for these coating compositions are aminoplast resins, polyisocyanates as well as compounds containing anhydride groups. The crosslinking agent is always added in such an amount that the molar ratio of the OH groups of the copolymer (A) to the reactive groups of the crosslinking agent is between 0.3:1 and 3:1.

Aminoplast resins which are suitable as curing agent components are preferably melamine and/or benzoguanamine resins. These are etherified melamine or benzoguanamine-formaldehyde condensation products. The compatibility of the resins with other film formers and solvents is influenced by the chain length of the etherifying alcohol and the degree of etherification. The principal etherification components are n-butanol and isobutanol as well as methanol. The hexamethoxymethylmelamine resins are highly significant. They have the disadvantage, however, that such combinations only cure at temperatures above 150° C. and often require the addition of an acid catalyst. On the other hand, the resins prepared with less formaldehyde and/or etherified with secondary or tertiary alcohols partly crosslink even below 100° C. The corresponding urea and urethane resins may be also used.

The polyisocyanates used for the crosslinking of the copolymers (A) are the same polyisocyanates used for the preparation of the compound (B). Reference should therefore be made to the description of the compound (B) for suitable examples. Furthermore, however, the polyisocyanates may be also attached to prepolymers having a higher molecular weight. Examples of these are adducts obtained from toluylene diisocyanate and trimethylolpropane, a biuret formed from 3 molecules of hexamethylene diisocyanate, as well as the trimers of the hexamethylene diisocyanate, and of 3,5,5-trimethyl-1-isocyanato-3-isocyanatomethylcyclohexane.

The amount of the crosslinking agent employed is chosen such that the ratio of the isocyanate groups of the crosslinking agent to the hydroxyl groups of the component (A) is in the range of 0.3:1 to 3.5:1.

Combinations with polyisocyanates or with resins carrying isocyanate groups rapidly crosslink even at room temperature.

However, it is also possible to use the isocyanates described above which have been reacted with the customary blocking agents, for example phenols, alcohols, acetoacetic esters, ketoxime and ε-caprolactam. These combinations are stable at room temperature and generally only cure at temperatures above 100° C. In special cases, for example when acetoacetic esters are used as blocking agents, crosslinking may also occur even below 100° C.

Suitable curing agents are also compounds and resins which contain carboxylic anhydride groups and which react with the polymers according to the invention via ester formation. The curing temperature depends on the reactivity of the anhydride group contained in the other component of the combination. Thus, for example, it is possible, using polyfunctional compounds or resins, to make available coating compositions which crosslink even at 80° to 120° C.

In addition, the coating compositions according to the invention may contain customary auxiliary substances and additives, for example flow-out agents, silicone oils, plasticizers, such as phosphoric acid esters and phthalic acid esters, pigments and fillers, viscosity regulators, matting agents, UV absorbers and light-protecting agents. These coating compositions may be applied to a substrate as a film by spraying, flowing, dipping, rolling, blade-coating or brushing, the film being subsequently cured to form a strongly adhering coating.

The coating compositions according to the invention are suitable for automotive refinishing and particularly for use as primers and fillers, provided that by a suitable choice of curing components, low temperatures between 20° and 80° C. may be employed (see above).

The invention is elucidated in greater detail by the examples below. All parts and percentages are parts and percentages by weight, unless expressly stated otherwise.

Polyisocyanate solution 1

The polyisocyanate solution 1 used in the examples consists of the following components:
33.3 parts of trimerized hexamethylene diisocyanate, 90% in a 1:1 mixture of butyl acetate/Solvent-naphtha ®
15.0 parts of trimerized isophorone diisocyanate, 70% in Solventnaphtha ®
22.3 parts of butyl acetate
15.6 parts of butylglycol acetate
3.5 parts of 3-methoxybutyl acetate
3.5 parts of xylene
4.9 parts of a commercial mixture of monocyclic terpenes with a boiling range of 162° to 182° C.
0.9 parts of Solventnaphtha ®
1.0 parts of a catalyst solution (1 part of dibutyltin dilaurate, dissolved in 50 parts of butyl acetate, 44 parts of Solventnaphtha ® and 5 parts of 3-methoxybutyl acetate)

Paint thinner 1

The paint thinner 1 consists of the following components:
15 parts of xylene
13 parts of Solventnaphtha ®
10 parts of a commercial mixture of hydrocarbons with a boiling range of 135° to 185° C. and an aromatic hydrocarbon content of about 16.5%
50 parts of butyl acetate
5 parts of 1-methoxypropyl 2-acetate
3 parts of butylglycol acetate
2 parts of 3-methoxybutyl acetate
2 parts of a commercial mixture of monocyclic terpenes with a boiling range of 162° to 182° C.

EXAMPLE 1

201.6 parts of Solventnaphtha ® (a mixture of C3–C4-alkyl-substituted aromatic hydrocarbons) and 264 parts of a commercial mixture of vinyl esters of saturated aliphatic monocarboxylic acids of predominantly 10 carbon atoms, branched at the α-carbon atom, are introduced in a 4-liter stainless steel reaction vessel provided with a stirrer, reflux condenser and inlet tubes and the mixture is heated to 170° C.

The following materials are weighed into the monomer storage vessel I and mixed:
120.0 parts of methyl methacrylate
216.0 parts of hydroxyethyl methacrylate
2.4 parts of dodecyl mercaptan The following material is weighed into the monomer storage vessel II:
600.0 parts of styrene The following materials are weighed into the initiator storage vessel and mixed:
108.0 parts of Solventnaphtha ®
36.0 parts of di-tert-butyl peroxide The contents of the monomer storage vessel I are added uniformly to the reaction vessel over 4.5 hours. The contents of the monomer storage vessel II are added to the reaction vessel over 4.5 hours at such a rate that 100 parts of styrene are added in the first 90 minutes, 200 parts are added from the 91st to the 180th minute of the total addition period and 300 parts are added in the remaining addition period. During the addition the temperature in the reaction vessel is kept at 165°–170° C. When all the additions have been completed, a further
18.0 parts of Solventnaphtha ® and
6.0 parts of di-tert-butyl peroxide
are added over one hour from the initiator storage vessel. Postpolymerization is then carried out for a further 2 hours at this temperature.

The mixture is dissolved in 342.0 parts of butyl acetate. The solids content (1 hour 130° C.) of this copolymer solution 1 is 71%, the viscosity (50% in ethylglycol acetate) 0.85 dPa.s (measured at 23° C.).

The residual content of free vinyl ester monomer in the 71% polymer solution 1 is determined by gas chromatography. A residual content of 1.5% by weight was found. (This corresponds to a residual monomer content of 9.6% by weight, based on the total content of the vinyl ester monomer used.)

EXAMPLE 2

325.6 parts of Shellsol A ® (mixture of C3–C4-alkyl-substituted aromatic hydrocarbons) and 360.0 parts of a commercial mixture of vinyl esters of saturated aliphatic monocarboxylic acid of predominantly 10 carbon atoms, branched at the α-carbon atom, are introduced in a 4-liter stainless steel reaction vessel provided with a stirrer, reflux condenser and inlet tubes.

The following materials are weighed into the monomer storage vessel I and mixed:
252.0 parts of n-butyl acrylate
468.0 parts of hydroxyethyl methacrylate
144.0 parts of methyl methacrylate
36.0 parts of methacrylic acid
27.0 parts of mercaptoethanol The following material is weighed into the monomer storage vessel II:
540.0 parts of styrene The following materials are weighed into the initiator storage vessel and mixed:
129.6 parts of Shellsol A ®
43.2 parts of di-tert-butyl peroxide The mixture is heated to 160°–170° C. and the contents of the monomer storage vessel I and the initiator storage vessel are added uniformly to the reaction vessel over 4.5 hours. The contents of the monomer storage vessel II are added over 4.5 hours at such a rate that 25% of the styrene are added in the first 90 minutes, 35% of the styrene are added from the 91st to the 180th minute and 40% of the styrene are added over the remaining addition period.

Subsequently the following were added from the initiator storage vessel over 1 hour:
13.5 parts of Shellsol A ®
4.5 parts of di-tert-butyl peroxide The temperature is kept to about 165° C. during the polymerization.

The reaction mixture is then dissolved in 330 parts of xylene, and 72.2 parts of a monoisocyanate (prepared from 1 mol of isophorone diisocyanate and 1 mol of dimethylethanolamine, 50% in xylene) are added. After about 4 hours at 60° C. the addition of the monoisocyanate is complete. The mixture is dissolved in 189 parts of butyl acetate.

The resultant copolymer solution II has a solids content of 64.9% (15′ 180° C.), and a viscosity of 21 dpa.s (original) or 0.8 dPas.s (50% in butyl acetate), in each case measured at 23° C. The residual content of free vinyl ester monomers in the 65% solution was determined by gas chromatography and found to be 0.5–1.0% by weight. This corresponds to a residual monomer content of 3.8 to 7.6% by weight, based on the total amount of the vinyl ester monomer used.

The resultant original copolymer solution 2 (solids content 64.9% at 15′ 180° C.) is thinned with methoxypropyl acetate to a solids content of 62% (copolymer solution 2a). 45.65 parts of the copolymer solution 2a (solids content 62%) are added to 54.35 parts of a tinter paste based on a commercial hydroxyacrylate (hydroxyl value 150 mg of KOH/g). This stock paint solution is mixed in a 2:1 ratio by volume with the polyisocyanate solution 1. The spraying viscosity is adjusted to 18 seconds, measured in a DIN 4 efflux cup, using 10% by weight, based on the stock paint solution, of the paint thinner 1. This paint 1 was used to produce coatings on glass and these were baked for 30 minutes at 60° C. The test results are shown in Table 1.

In addition, the paint 1 was applied to phosphated steel panels, coated with a commercial 2-pack polyurethane filler (hydroxyl components = polyester-modified acrylate containing hydroxyl groups with a hydroxyl value of 140–150 mg of KOH/g; isocyanate component = hexamethylene diisocyanate trimerized via a biuret structure) and baked for 30 minutes at 60° C. The test results are given in Table 2.

COMPARISON EXAMPLE 1

The monomeric mixture obtained in Example 1 was used to prepare a copolymer solution 3 following the procedure given in the English language technical report "Veo Va polymers LR 40 and LR 2041 for water-thinnable paints" by Shell as follows:

147 parts of Solventnaphtha ®, 165 parts of 2-methoxypropyl 1-acetate, 264 parts of a commercial mixture of vinyl esters of saturated aliphatic monocarboxylic acids of predominantly 10 carbon atoms, branched at the α-carbon atoms, 60 parts of styrene and 2.4 parts of di-tert-butyl peroxide are introduced in a 4-liter stainless steel reaction vessel provided with a stirrer, reflux condenser and inlet tubes, and the mixture is heated to 160° C.

The following materials are weighted into the monomer storage vessel and mixed:
540.0 parts of styrene
194.4 parts of hydroxyethyl methacrylate
108.0 parts of methyl methacrylate The following materials are weighed into the initiator storage vessel and mixed:
21.6 parts of tert-butyl perbenzoate
64.8 parts of Solventnaphtha ®
2.4 parts of dodecyl mercaptan The contents of the monomer and initiator storage tanks are added to the reaction vessel at a uniform rate over 4.5 hours, the temperature being maintained at 155°–160° C. Subsequently
21.6 parts of hydroxyethyl methacrylate and
12.0 parts of methyl methacrylate
are subsequently added from the monomer storage vessel over 0.5 hour, and
10.8 parts of Solventnaphtha ®
3.6 parts of tert-butyl perbenzoate
are added from the initiator storage vessel.
0.5 hour after this addition, a further
25.2 parts of Solventnaphtha ®

8.4 parts of tert-butyl perbenzoate
are added from the initiator storage vessel over 0.5 hour. After 0.5 hour postpolymerization the mixture is dissolved in 253.8 parts of butyl acetate.

The resultant copolymer solution 3 had a solids content (1 hour 130° C.) of 67.3% has a viscosity of 1.65 dPa.s (50% in ethylglycol acetate at 23° C.). Under the same conditions as with the copolymer solution 1, the residual content of free vinyl ester monomers was determined in the 67.3% polymer solution by gas chromatography. A content of 5.1% by weight was found. This corresponds to a residual monomer content of 33% by weight, based on the total amount of the vinyl ester used, taking account of the theoretical solids content of the polymer solution of 70%.

COMPARISON EXAMPLE 2

A copolymer solution 4 was prepared following the procedure of the English language technical report "Veo Va polymers LR-40 and LR-2041 for water-thinnable paints" by Shell as follows:

400.0 parts of a commercial mixture of vinyl esters of unsaturated aliphatic monocarboxylic acids of predominantly 10 carbon atoms, branched at the α-carbon atom,
120.0 parts of styrene,
421.4 parts of Shellsol A ® and
5.7 parts of di-tert-butyl peroxide
are introduced in a 4-liter stainless steel reaction vessel provided with a stirrer, reflux condenser and inlet tubes, and the mixture is heated to 150°–155° C.

The following materials are weighted into the monomer storage vessel and mixed:
480.0 parts of styrene
252.0 parts of n-butyl acrylate
468.0 parts of hydroxyethyl methacrylate
144.0 parts of methyl methacrylate
36.0 parts of methacrylic acid The following materials are weighed into the initiator vessel and mixed:
351.2 parts of Shellsol A ®
22.8 parts of tert-butyl perbenzoate The contents of the monomer and initiator storage vessels are added to the reaction vessel at a uniform rate over 4.5 hours, while the temperature is kept at 150°–155° C. during the addition. The following are then added from the monomer storage vessel over 0.5 hour:
28.0 parts of n-butyl acrylate
52.0 parts of hydroxyethyl methacrylate
16.0 parts of methyl methacrylate
4.0 parts of methacrylic acid
and from the initiator vessel
105.36 parts of Shellsol A ®
5.52 parts of tert-butyl perbenzoate.

Three 4.8 parts portions of tert-butyl perbenzoate are added after 0.5 hour at a 0.5 hour intervals. To 1,486.5 parts of this copolymer solution obtained in this manner 41.9 parts of a monoisocyanate (adduct obtained from 1 mol of isophorone diisocyanate and 1 mol of dimethylethanolamine, 50% in xylene) are added and caused to add to the polymer at 60° C. over 4 hours. The mixture is then dissolved in 100.4 parts of butyl acetate and 76.5 parts of 1-methoxypropyl 2-acetate.

The copolymer solution 4 obtained in this manner has a solids content of 63.8%, and the original viscosity is >40 dPa.s (at 23° C.).

The content of free vinyl ester monomers in the 64.8% solution was 1.5–2% by weight. This corresponds to a residual monomer content of 11.5 to 15.2% by weight, based on the total amount of the vinyl ester employed.

The resultant copolymer solution 4 is thinned to a solids content of 62% using methoxypropyl acetate. 45.65 parts of the copolymer solution 4 (solids content 62%) are added to 54.35 parts of a tinter paste based on a commercial hydroxyacrylate (hydroxyl value 150 mg of KOH/g). In the same manner as in Example 2, this stock paint solution is mixed with the polyisocyanate solution 1 in a 2:1 ratio by volume. The spraying viscosity is adjusted to 18 seconds, measured in a DIN 4 efflux cup, using 22% by weight, based on the stock paint, of the paint thinner 1. In the same manner as in Example 2, this paint 2 was applied to glass and the coating was baked for 30 minutes at 60° C. The test results are shown in Table 1. In addition, in the same manner as in Example 2, the paint 2 was applied to phosphated steel panels coated with the filler described in Example 2 and baked for 30 minutes at 60° C. The test results are shown in Table 2.

TABLE 1

| | Test results with the coatings on glass | | | |
|---|---|---|---|---|
| | Paint 1 | Paint 2 comparison | Paint 3 | Paint 4 comparison |
| Pendulum hardness according to König (seconds) | 157 | 134 | 151 | 141 |

TABLE 2

Test results on coated steel panels
The steel panels were kept for 1 hour at room temperature after baking and then subjected to the tests.

| | Paint 1 | Paint 2 comparison | Paint 3 | Paint 4 comparison |
|---|---|---|---|---|
| Film thickness dry (μm) | 65 | 60 | 78 | 60 |
| Degree of gloss 60°, Gardner | 87° | 86° | 90° | 90° |
| Crosshatch test (DIN 53151) after 240 hours water spray test[a] | Gt 1 | Gt 2 | — | — |
| Adhesion test[b] | s.m. | s.m. | s.m. | s.m. |
| DOI[c] | 91.8 | 92.3 | 87.3 | 84.9 |
| Tack-free drying time at room temperature (minutes) | — | — | 300 | 285 | s.m.: slight marking
[a]long-term spray with deionized water at 20° C.
[b]adhesion of Tesa film to the panels. After an adhesion time of 1 hour the Tesa film is removed and the area is examined for any marking.
[c]Distinctness of Reflected Image The direct reflection is measured at a gloss angle of −30° and in the immediate proximity of the gloss angle at −30°±0.3°, using an illumination of the surface to be assessed below 30° C. The DOI value determined therefrom corresponds to the sharpness of the mirror image, perceived visually, of an object on the surface. The DOI value is also called image sharpness value.

Measurement values: 100 = best
0 = worst

-continued

| Measuring instrument | Illumination | Observation |
|---|---|---|
| DORIGON | 30° | −30°, −29.7°, 30.3° |
| D 47 R-6F from Hunter-Lab | | |

EXAMPLE 3

The copolymer solution 2 prepared in Example 2 (solids content 64.9%, 15' 180° C.) is thinned to a solids content of 62% using 1-methoxypropyl 2-acetate and processed to a clearcoat paint 3 using the components listed in Table 3. The resultant clearcoat paint 3 was mixed with the polyisocyanate solution 1 in a 2:1 ratio by volume. The resultant mixture had a viscosity of 16 seconds (measured with a DIN 4 cup at 23° C.). After a 4 hour storage of the clearcoat composition at room temperature the viscosity rose to 28 seconds (DIN 4 cup, 23° C.) and after 6 hour storage at room temperature to 68 seconds (DIN 4 cup, 23° C.). In the same manner as in Example 2, this paint 3 was applied to glass to form coatings (film thickness dry 20 μm) and baked for 30 minutes at 60° C. The test results are given in Table 1.

In addition, the clearcoat mixture 3 was applied immediately after preparation as a clearcoat by to the wet-on-wet process onto a commercial basecoat paint (silver metallic basecoat paint based on cellulose acetobutyrate, polyester, melamine resin, wax) and baked for 30 minutes at 60° C. The basecoat paint had in turn been applied beforehand to phosphated steel panels coated by the filler described in Example 2. The test results are given in Table 2.

COMPARISON EXAMPLE 3

The copolymer solution 4 prepared in the comparison Example 2 is thinned with 1-methoxypropyl 2-acetate to a solids content of 62% and processed to a clearcoat paint 4 using the components listed in Table 3 in the same manner as in Example 3. The resultant clearcoat paint 4 was mixed with the polyisocyanate solution 1 in a 2:1 ratio by volume and treated with 10% by volume, based on the clearcoat paint 4, of the paint thinner 1. The resultant clearcoat mixture had a viscosity of 19 seconds (DIN 4 cup, 23° C.). After 4 hour storage at room temperature the viscosity of the mixture had already increased to such an extent (start of gelling) that the clearcoat paint 4 could no longer be processed.

In the same manner as in Example 3, coatings on glass were prepared using this paint 4 (film thickness dry 20 μm) and baked for 30 minutes at 60° C.). The test results are shown in Table 1.

In addition, this paint 4 was applied immediately after preparation in the same manner as in Example 3 to the basecoat paint described in Example 3 as a dearcoat paint by the wet-on-wet process (film structure similar to Example 3) and baked for 30 minutes at 60° C. The test results are shown in Table 2.

In addition, in contrast to Example 3, a color shift of the basecoat paint could be observed through the clearcoat paint 4.

TABLE 3

| Formulations of the clearcoat paints 3 and 4 | | |
|---|---|---|
| | Clearcoat paint 3 | Clearcoat paint 4 |
| Copolymer solution 2 | 75.7 parts | — |
| Copolymer solution 4 | — | 75.7 parts |
| Xylene | 1.2 parts | 1.2 parts |
| Butyl acetate | 14.1 parts | 14.1 parts |
| Solventnaphtha ® | 0.9 parts | 0.9 parts |
| Butylglycol acetate | 0.7 parts | 0.7 parts |
| Silicone oil solution | 3.7 parts | 3.7 parts |
| Catalyst solution[a] | 1.5 parts | 1.5 parts |
| Light-protecting agent (hindered amine) | 1.2 parts | 1.2 parts |
| UV absorber (benztriazole) | 1.0 part | 1.0 part |

[a]The catalyst solution consists of the solution of 1 part of dibutyltin dilaurate in 50 parts of butyl acetate, 44 parts of Solventnaphtha ® and 5 parts of 3-methoxybutyl acetate.

We claim:
1. A process for the preparation of copolymer (A) containing hydroxyl groups, based on vinyl esters, vinylaromatic hydrocarbons and hydroxyalkyl esters of $\alpha,\beta$-unsaturated carboxylic acids and prepared by free-radical solution polymerization, wherein copolymer (A) includes
 $a_1$) 5 to 25% by weight of one or more vinyl esters of monocarboxylic acids, branched in the $\alpha$ position,
 $a_2$) 10 to 50% by weight of one or more vinylaromatic hydrocarbons,
 $a_3$) 10 to 40% by weight of one or more hydroxyalkyl esters of $\alpha,\beta$-unsaturated carboxylic acids, where all weights are based on total composition weight and the sum of components $a_1$ to $a_3$ is always 100% by weight, wherein the components are reacted to form a copolymer (A) having a hydroxyl value of 50 to 200 mg of KOH/g, and an average molecular weight (number average) of 1500 to 6000, comprising reacting $a_1$–$a_3$ as follows:
 1.) at least 60% by weight of the total amount of the component $a_1$ is initially used,
 2.) components $a_2$ and $a_3$ and the remainder of the component $a_1$, if any, are added over a monomer addition period which is the same for all components in such a manner that
  i) the amount of the component $a_1$ added per unit time remains constant or decreases over the monomer addition period,
  ii) the amount of the component $a_3$ added per unit time remains constant over the monomer addition period, and
  iii) the amount of the component $a_2$ added over the first third of the monomer addition period is 15 to 30% by weight, that added over the second third is 25 to 40% by weight and that added over the last third is 35 to 60% by weight, where all amounts are based on the total amount of the component $a_2$.
2. The process of claim 1, further comprising the step of adding to components $a_1$–$a_3$, component $a_4$ which is 0 to 40% by weight based on total composition weight of other ethylenically unsaturated copolymerizable monomers selected from the group consisting of alkyl esters of olefinically unsaturated carboxylic acids, alkoxyethyl acrylates, aryloxyethyl acrylates, alkoxyethyl methacrylates, aryloxyethyl methacrylates, unsaturated carboxylic acids, unsaturated compounds with tertiary amino groups, acrylonitrile, methacryloni- trile, acrolein and methacrolein, wherein the sum of the components $a_1$ to $a_4$ is always 100% by weight.

3. The process of claim 1, wherein component $a_1$ includes one or more vinyl esters of monocarboxylic acids selected from the group consisting of vinyl esters of saturated aliphatic monocarboxylic acids, having from 9 to 11 carbon atoms per molecule, branched at the $\alpha$ carbon atom.

4. The process of claim 1, wherein the steps of reacting $a_1$–$a_3$ results in a copolymer (A) having an acid value of 5 to 30 mg of KOH/g.

5. The process of claim 1, wherein the steps of reacting $a_1$–$a_3$ results in a copolymer (A) having an acid value of 8 to 25 mg of KOH/g.

6. The process of claim 2, wherein the steps of reacting $a_1$ to $a_4$ results in a copolymer (A) having an amine value of 1 to 10 mg of KOH/g.

7. The process of claim 2, wherein the steps of reacting $a_1$ to $a_4$ results in a copolymer (A) having an amine value of 1 to 5 mg of KOH/g.

8. The process of claim 2, wherein
   $a_1$) one or more vinyl esters of a monocarboxylic acids is selected from the group consisting of vinyl esters of monocarboxylic acids, having from 5 to 15 carbon atoms per molecule, branched in the $\alpha$ position, and present in an amount of between 10 to 19% by weight,
   $a_2$) one or more vinylaromatic hydrocarbons is present in an amount of between 20 to 45% by weight,
   $a_3$) one or more hydroxyalkyl esters of $\alpha,\beta$-unsaturated carboxylic acids is present in an amount between 15 to 35% by weight,
   $a_4$) other ethylenically unsaturated copolymerizable monomers are present in an amount of 0 to 40% by weight, where all weights are based on total composition weight and the sum of the components $a_1$ to $a_4$ is always 100% by weight, wherein components $a_1$ to $a_4$ are reacted at temperatures of 130° to 200° C., to form a copolymer (A) having a hydroxyl value of 70 to 150 mg of KOH/g, and an average molecular weight (number average) of 1500 to 6000, in which
   1.) 100% by weight, of the total amount of the component $a_1$ is initially used,
   2.) the components $a_2$ to $a_4$ are added over a monomer addition period which is the same for all components in such a manner that
      i) the amount of the components $a_3$ and $a_4$ added per unit time remains constant over the monomer addition period, and
      ii) the amount of the component $a_2$ added over the first third of the monomer addition period is 18 to 26% by weight, that added over the second third is 30 to 38% by weight, and that added over the last third is 40 to 50% by weight, where all weights are based on the total amount of the component $a_2$.

9. A copolymer (A) containing hydroxyl groups, based on vinyl esters, vinylaromatic hydrocarbons and hydroxyl alkyl esters of $\alpha,\beta$-unsaturated carboxylic acids, prepared by free-radical solution polymerization, wherein the copolymer (A) has a hydroxyl value of 50 to 200 mg of KOH/g, and an average molecular weight (number average) of 1500 to 6000, comprising
   $a_1$) 5 to 25% by weight of one or more vinyl esters selected from the group consisting of vinyl esters of monocarboxylic acids branched in the $\alpha$ position,
   $a_2$) 10 to 50% by weight, of one or more vinylaromatic hydrocarbons,
   $a_3$) 10 to 40% by weight, of one or more hydroxyalkyl esters of $\alpha,\beta$-unsaturated carboxylic acids,
where all weights are based on total composition weight and the sum of the components $a_1$ to $a_3$ is always 100% by weight, in which
   1.) at least 60% by weight, of the total amount of component $a_1$ is initially used,
   2.) the components $a_2$ and $a_3$ and the remainder of the component $a_1$, if any, are added over a monomer addition period which is the same for all components in such a manner that
      i) the amount of the component $a_1$ added per unit time remains constant or decreases over the monomer addition period,
      ii) the amount of the components $a_3$ added per unit time remains constant over the monomer addition period, and
      iii) the amount of the component $a_2$ added over the first third of the monomer addition period is 15 to 30% by weight, that added over the second third is 25 to 40% by weight, and that added over the last third is 35 to 60% by weight, where all amounts are based on the total amount of the component $a_2$.

10. The copolymer (A) as claimed in claim 9, further comprising
   $a_4$) 0 to 40% by weight based on total composition weight of other ethylenically unsaturated copolymerizable monomers selected from the group consisting of alkyl esters of olefinically unsaturated carboxylic acids, alkoxyethyl acrylates, aryloxyethyl acrylates, alkoxyethyl methacrylates, aryloxyethyl methacrylates, unsaturated carboxylic acids, unsaturated compounds with tertiary amino groups, acrylonitrile, methacrylonitrile, acrolein and methacrolein, wherein the sum of the components $a_1$ to $a_4$ is always 100% by weight.

11. The copolymer (A) as claimed in claim 9, wherein one or more vinyl esters of monocarboxylic acids is selected from the group consisting of vinyl esters of saturated aliphatic monocarboxylic acids, having from 9 to 11 carbon atoms per molecule, branched at the $\alpha$ carbon atom.

12. The copolymer (A) as claimed in claim 9, wherein the copolymer (A) has an acid value of 5 to 30 mg of KOH/g.

13. The copolymer (A) as claimed in claim 10, wherein the copolymer (A) has an amine value of 1 to 10 mg of KOH/g.

14. The copolymer (A) as claimed in claim 10, wherein the copolymer (A) has an amine value of 1 to 5 mg of KOH/g.

15. The copolymer (A) of claim 9, wherein the copolymer (A) has a hydroxyl value of 70 to 150 mg of KOH/g and includes
   $a_1$) 10 to 19% by weight of one or more vinyl esters of monocarboxylic acids of 5 to 15 carbon atoms per molecule,
   $a_2$) 20 to 45% by weight, of one or more vinylaromatic hydrocarbons,
   $a_3$) 15 to 35% by weight, of one or more hydroxyalkyl esters of $\alpha,\beta$-unsaturated carboxylic acids,
   $a_4$) 0 to 40% by weight of other ethylenically unsaturated copolymerizable monomers, where all weights are based on total composition weight and the sum of the components $a_1$ to $a_4$ is always 100% by weight, in which
1.) 100% by weight of the total amount of the component $a_1$ is initially used,
2.) the components $a_2$ to $a_4$ are added over a monomer addition period which is the same for all components in such a manner that the amount of the components $a_3$ and $a_4$ added per unit time remains constant over the monomer addition period, and the amount of the component $a_2$ added over the first third of the monomer addition period is 18 to 26% by weight, that added over the second third is 30 to 38% by weight, and that added over the last third is 40 to 50% by weight, where all weights are based on the total amount of the component $a_2$.

16. A coating composition which contains as binder the copolymer (A) containing hydroxyl groups, based on vinyl esters, vinylaromatic hydrocarbons and hydroxyl alkyl esters of $\alpha,\beta$-unsaturated carboxylic acids, prepared by free-radical solution polymerization, wherein the copolymer (A) has a hydroxyl value of 50 to 200 mg of KOH/g, and an average molecular weight (number average) of 1500 to 6000, comprising
   $a_1$) 5 to 25% by weight of one or more vinyl esters selected from the group consisting of vinyl esters of monocarboxylic acids branched in the $\alpha$ position,
   $a_2$) 10 to 50% by weight, of one or more vinylaromatic hydrocarbons,
   $a_3$) 10 to 40% by weight, of one or more hydroxyalkyl esters of $\alpha,\beta$-unsaturated carboxylic acids,
where all weights are based on total composition weight and the sum of the components $a_1$ to $a_3$ is always 100% by weight, in which
   1.) at least 60% by weight, of the total amount of component $a_1$ is initially used,
   2.) the components $a_2$ and $a_3$ and the remainder of the component $a_1$, if any, are added over a monomer addition period which is the same for all components in such a manner that
      i) the amount of the component $a_1$ added per unit time remains constant or decreases over the monomer addition period,
      ii) the amount of the components $a_3$ added per unit time remains constant over the monomer addition period, and
      iii) the amount of the component $a_2$ added over the first third of the monomer addition period is 15 to 30% by weight, that added over the second third is 25 to 40% by weight, and that added over the last third is 35 to 60% by weight, where all amounts are based on the total amount of the component $a_2$.

17. The coating composition as claimed in claim 16, which contains polyisocyanates as curing agents.

* * * * *